Oct. 23, 1923.
A. G. SARGENT
1,471,981
TIRE MILEAGE INDICATOR
Original Filed Aug. 27, 1921
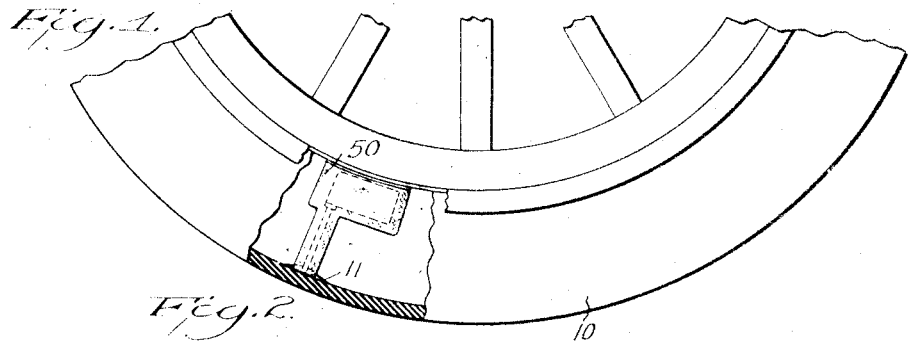
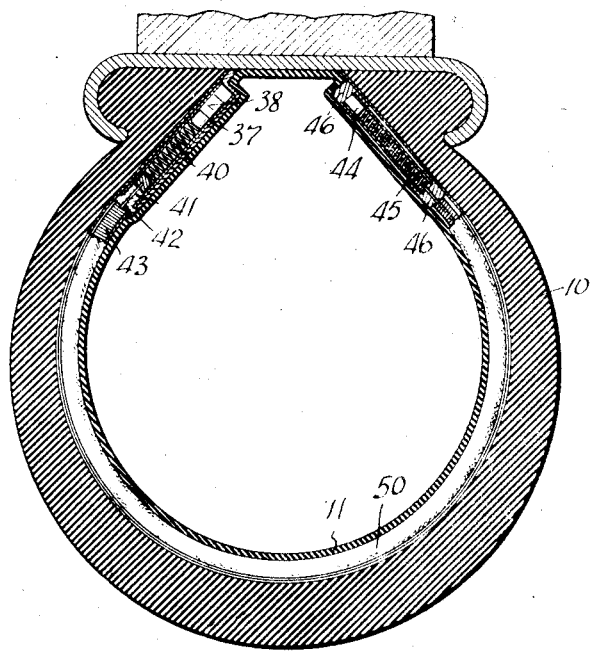
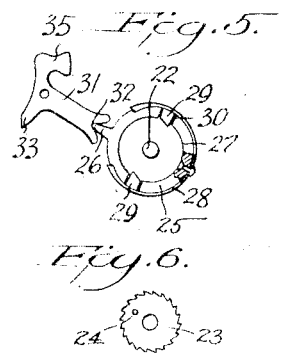
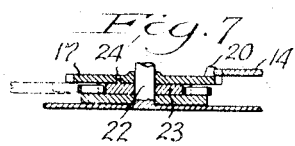
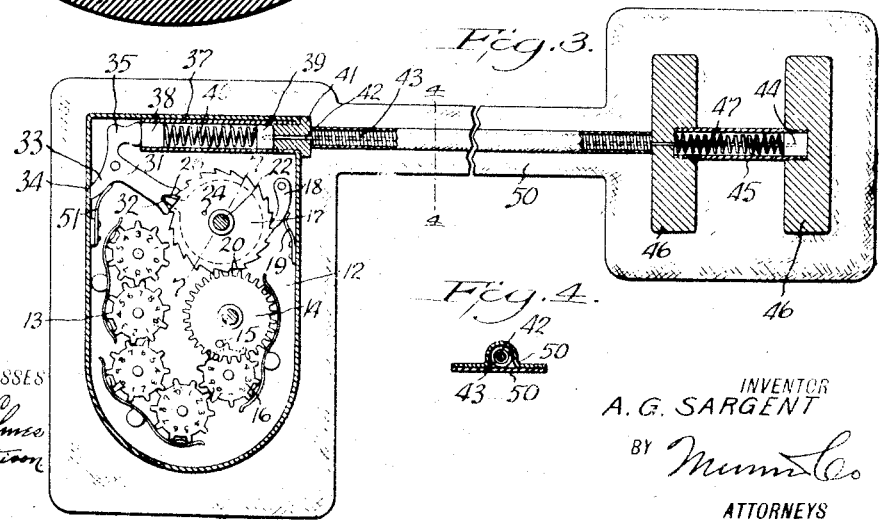
INVENTOR
A. G. SARGENT
ATTORNEYS Patented Oct. 23, 1923.

1,471,981

UNITED STATES PATENT OFFICE.

ARTHUR GILBERT SARGENT, OF NEW HAVEN, CONNECTICUT.

TIRE-MILEAGE INDICATOR.

Application filed August 27, 1921, Serial No. 496,036. Renewed May 2, 1923.

*To all whom it may concern:*

Be it known that I, ARTHUR GILBERT SARGENT, a citizen of the United States, and a resident of New Haven, in the county of New Haven and State of Connecticut, have invented a new and Improved Tire-Mileage Indicator, of which the following is a full, clear, and exact description.

The present invention relates to new and useful improvements in vehicle tires and it pertains more particularly to a registering means for indicating the number of miles traveled by a tire.

It is one of the important objects of the invention to provide an indicator or meter which will positively and accurately register the distance traveled by a vehicle tire.

It is another important object of the invention to so construct a device of this character that it is capable of attachment to a tire shoe or casing, the device being sufficiently small to permit of the above being carried out.

It is a further important object of the invention to provide means for protecting the device from outside shocks, and, at the same time, protect the tire shoe or casing with which it is used from injury or wear owing to its position therein.

It is a still further object of the invention to provide operating means for the registering mechanism, said operating means being so positioned with respect to the tire shoe or casing that it functions upon a transverse flexure of the tire shoe or casing, resulting in its contact with the roadway.

In addition the invention consists in certain novel features of construction, combination and arrangement of parts as will be hereinafter more fully described and claimed.

Referring to the drawings forming a part of the application—

Figure 1 is a detail view of a section of a wheel and tire, the tire being broken away generally to show the location of the device within the same;

Fig. 2 is an enlarged detail sectional view of a tire showing the location of the several parts of the improved device located therein;

Fig. 3 is a plan view on an enlarged scale of a device constructed in accordance with the present invention;

Fig. 4 is a transverse sectional view taken on the line 4—4 of Fig. 3;

Fig. 5 is a detail view partly in section of a portion of a registering mechanism;

Fig. 6 is a detail plan view of the ratchet wheel of the registering mechanism;

Fig. 7 is a detail sectional view taken on the line 7—7 of Fig. 3.

Referring more particularly to the drawings, the reference character 10 designates the tire shoe or casing, and 11 designates the inner tube thereof. The reference character 12 designates a suitable housing and in said housing is mounted a registering mechanism 13. This registering mechanism 13 is operated by a gear wheel 14 provided with a pin or the like 15 adapted to engage the teeth of the prime moving wheel 16 of the registering mechanism. The gear 14 is operated by means of a ratchet wheel 17 mounted in the housing 12, and said ratchet wheel is prevented from turning in one direction by means of a pawl 18 pressed into engagement with the teeth of the ratchet wheel 17, by means of a spring 19. This ratchet wheel 17 is adapted to underlie the gear wheel 14 and it is provided with a single lug or tooth 20 adapted to engage the teeth of the gear wheel 14 to rotate the same upon rotation of the ratchet wheel 17.

The ratchet wheel 17 is mounted upon a suitable staff or shaft 22, and mounted on said staff or shaft 22 beneath the ratchet wheel 17, is a ratchet wheel 23. This ratchet wheel 23 is provided on its upper face with a projecting lug 24 adapted to lie within an opening in the ratchet wheel 17 in order that said ratchet wheel 17 may be rotated by the ratchet wheel 23. To provide for operating the ratchet wheel 23, a circular member 25 is adapted to surround said ratchet wheel 23, and said circular member 25 has a rigid lug or pawl 26 projecting therefrom.

Secured to the circular member 25 by rivets or the like 27, is a resilient member 28, and said resilient member 28 carries two pawls 29 oppositely disposed with respect to one another. These two pawls 29 are adapted to engage the teeth of the ratchet wheel 23 to rotate the same upon oscillating movement of the circular member 25, it being understood that the pawls 29 project through openings 30 in the circular member into engagement with the teeth of the ratchet wheel 23.

The reference character 31 designates a pivoted lever, one end of which is bifurcated as at 32 and said bifurcated end 32 is adapted to receive the lug or pawl 26 of the circular member 25. This pivoted lever 31 is provided with an arm 33 adapted to engage one of the walls of the housing 12, as indicated by the reference character 34 in Fig. 3, and this construction limits the rocking movement of the pivoted lever 31 in one direction.

Oppositely disposed with respect to the projecting arm 33 of the lever 31, is an arm 35, and said arm 35 is angularly disposed with respect to the body portion of the lever as shown.

Rigidly secured within the housing 12 is a cylindrical barrel or the like 37, and slidably mounted in said barrel 37 is a plug or block 38, said plug or block 38 being so positioned within said barrel 37 as to engage the free end of the arm 35 of the lever 31, as more clearly shown in Fig. 3. Mounted in the other end of the barrel 37, is a similar plug 39, and interposed between the plugs 38 and 39, is a coil spring 40. The reference character 41 designates a plug threaded into the end of the barrel 37 to close the same and slidably mounted in said plug 41 is one end of a flexible shaft 42. This flexible shaft is in the form of a stiff flexible wire enclosed within a suitable coil housing 43 to ensure of said flexible wire shaft moving longitudinally in operation. The opposite end of this flexible shaft 42 is connected to a plug or the like 44 mounted in a cylindrical member 45, said cylindrical member being rigidly secured between two rigid members 46. Interposed between one of the rigid members 46 and the plug 44, is a coil spring 47 adapted to maintain the plug 44 in the position shown in Fig. 3.

The foregoing described mechanism is adapted to be positioned between the inner face of the inner wall of the shoe or casing 10 and the inner tube 11, as more clearly shown in Figs. 1 and 2, with the registering mechanism positioned upon one side of the tire and the anchoring mechanism comprising the two members 46 positioned upon the opposite side of the tire and the flexible shaft 42 and its coil housing 43 extending transversely of the tire shoe or casing in contact with the inner wall thereof, as more clearly shown in Fig. 2.

In positioning the mechanism within the tire shoe or casing 10, the same is enclosed in a suitable protecting covering 50, which may be composed of canvas, rubber, or other material found suitable for the purpose. In some instances it may be advisable to embed the same in the tire structure, but the method of attachment not forming a part of the present invention no claim is made therefor, and it is understood that the device may be attached in any operable manner to a vehicle tire without departing from the spirit of the invention.

The device operates in the following manner:

Upon each revolution of the wheel, the flexible shaft 42 will reach a position at the lowermost point of the wheel, and owing to a transverse flexing of the shoe or casing 10 caused by the weight of the vehicle, the tire in flattening out will cause a longitudinal movement of the flexible shaft 42. Inasmuch as the members 46 serve as an anchor and the plug 44 prevents movement of the flexible shaft 42 in one direction (i. e., to the right in Fig. 3), the flexible shaft 42 reciprocates the block 39 and through the medium of the coil spring 40, the block 38 engages the arm 35 of the lever 31 and rocks said lever 31 about its pivotal point against the action of a spring 51 carried by the housing. Upon rocking movement of the lever 31 the ratchet wheel 23 will be rotated and through the medium of the pin 24, the ratchet wheel 17 will be rotated. As this ratchet wheel 17 makes a complete revolution, the lug or tooth 20 will engage the teeth of the gear 14 and will periodically set up a movement of said gear 14 which serves to operate the registering mechanism.

The above-mentioned operation will take place at each complete revolution of the wheel and if the proper ratio in the registering mechanism is carried out, it is apparent that the exact mileage traveled by the tire can be ascertained when the same is equipped with a device constructed in accordance with the present invention.

By the interposition of the spring 40 between the two blocks 38 and 39, it is apparent that heavy shocks received by the tire owing principally to improper inflation thereof are absorbed by the spring and prevent injury to the registering mechanism.

While in the present illustrated example only one embodiment of the invention is shown and described, it is to be understood that modifications in the structure of the several parts thereof and the relation of the indicator to the tire may be varied as conditions of use and good mechanical practice dictate without departing from the spirit of the invention, and therefore I do not wish to be limited to the specific construction and arrangement of parts shown and described.

I claim:

1. In combination with a tire for vehicles, a mileage indicator comprising registering mechanism within the tire adjacent its rim portion, and means operated by the crosswise flexure of the tire to actuate the registering mechanism.

2. In combination with a pneumatic tire for vehicles, a mileage indicator therefor comprising a registering mechanism mounted in a fixed position on the inner wall of the tire, a flexible shaft movable with respect to the registering mechanism by the crosswise flexure of the tire, and means operated by said flexible shaft for periodically operating the said registering mechanism.

3. In combination with a pneumatic tire for vehicles, a mileage indicator comprising registering mechanism mounted in a fixed position within the tire, a flexible spring arm movable with respect to said registering mechanism, and a flexible hollow runway mounted in fixed position on the inner face of the tire and running crosswise thereof, said runway providing a passage for the said flexible spring arm and permitting of free movement of said arm with respect to said passage upon crosswise flexure of the tire.

4. A mileage indicator for pneumatic tires comprising a registering mechanism, an operating means therefor, said operating means conforming to the transverse shape of the tire and adapted to be operated upon transverse flexure of the tire due to its contact with the road surface.

5. A device of the character described comprising a registering mechanism adapted to be placed within the shoe or casing of a tire, an anchor carried by the shoe or tire, a flexible shaft rigidly connected at one end to the anchor and having a movable end arranged adjacent the registering mechanism, and means for operating said registering mechanism, said means operated by said flexible shaft upon flexure thereof.

6. In a device of the character described, a registering mechanism, a pivoted lever for operating said registering mechanism, and means adapted for operating said pivoted lever, said means occupying a normal position and operated upon distortion from the normal position.

7. In combination with a pneumatic tire for vehicles, a mileage indicator therefor comprising a registering member mounted within said tire at one side thereof adjacent the heel portion of the tire, a flexible member extending from said registering member transversely across the thread portion of the tire and rigidly anchored at the opposite side of the tire, and means interposed between said registering member and flexible member whereby cross-wise flexure of the tire will actuate said registering mechanism.

8. In combination with a pneumatic tire for vehicles, a mileage indicator therefor comprising registering mechanism mounted within said tire at one side thereof between the thread and heel position of the tire, a flexible rod having one end movable and disposed adjacent said registering mechanism and extending transversely at least across the tread of the tire, and rigidly anchored at that end, and cooperating means connecting said rod and registering mechanism whereby transverse flexure of the tire will actuate the registering mechanism.

ARTHUR GILBERT SARGENT.